Aug. 12, 1930.  S. M. FAIRCHILD  1,772,889
WING LANDING LIGHT
Filed Jan. 25, 1929   2 Sheets-Sheet 1
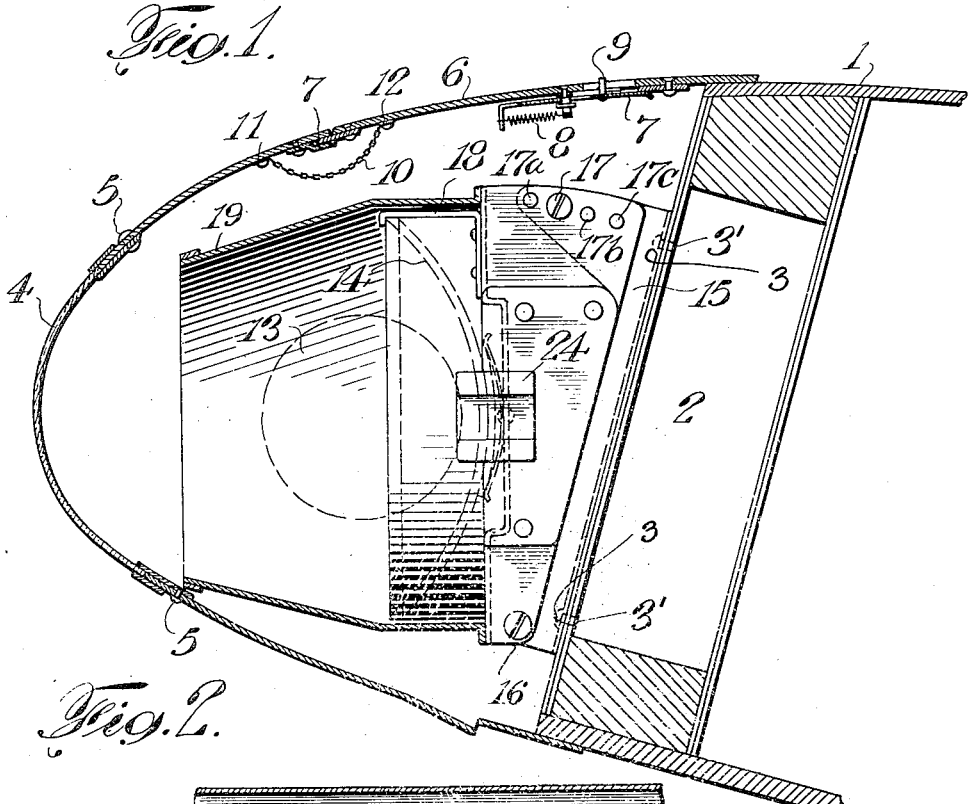
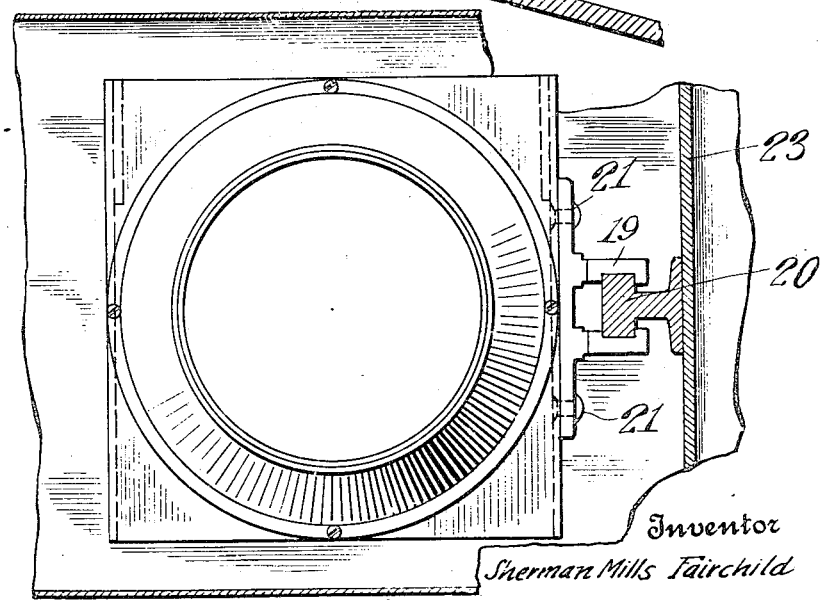
Inventor
Sherman Mills Fairchild
By his Attorney
Hoguet & Neary Aug. 12, 1930.  S. M. FAIRCHILD  1,772,889
WING LANDING LIGHT
Filed Jan. 25, 1929  2 Sheets-Sheet 2

Inventor
Sherman Mills Fairchild
By his Attorney
Hoguet & Meany

Patented Aug. 12, 1930

1,772,889

UNITED STATES PATENT OFFICE

SHERMAN MILLS FAIRCHILD, OF NEW YORK, N. Y., ASSIGNOR TO FAIRCHILD AVIATION CORPORATION, OF NEW YORK, N. Y., A CORPORATION OF DELAWARE

WING LANDING LIGHT

Application filed January 25, 1929. Serial No. 334,890.

This invention relates in general to landing lights for aeroplanes and more particularly to lights so designed as to avoid the creation of added wind resistance or other disturbing factors.

An object of my invention is to provide landing lights to be mounted wholly within the aerofoil of an aircraft, and to provide the leading edge of the aerofoil with an orifice covered with a section of transparent material of sufficient area for lighting purposes and of such contour as to blend perfectly with the streamline effect of the remainder of the aerofoil.

A more particular object is to obtain the ideal projection of light by arranging the light bulb at a considerable distance rearwardly of the leading edge and by providing a reflector of such nature that the reflected light beams will focus at such point as to provide for long range light projection.

A further object in this connection is to provide for adjustment of the light assembly to meet requirements in light projection under various applications and conditions.

With the foregoing and other objects in view, the invention resides in the combination of parts and in the details of construction hereinafter set forth, certain embodiments of the invention being illustrated in the accompanying drawings in which:

Figure 1 is a vertical longitudinal section through the leading edge of an aircraft wing in which the light assembly is shown attached to the leading wing spar.

Figure 2 is a front elevation of the leading edge of the wing, partly broken away to show the sliding adjustment of the light assembly.

Figure 3:
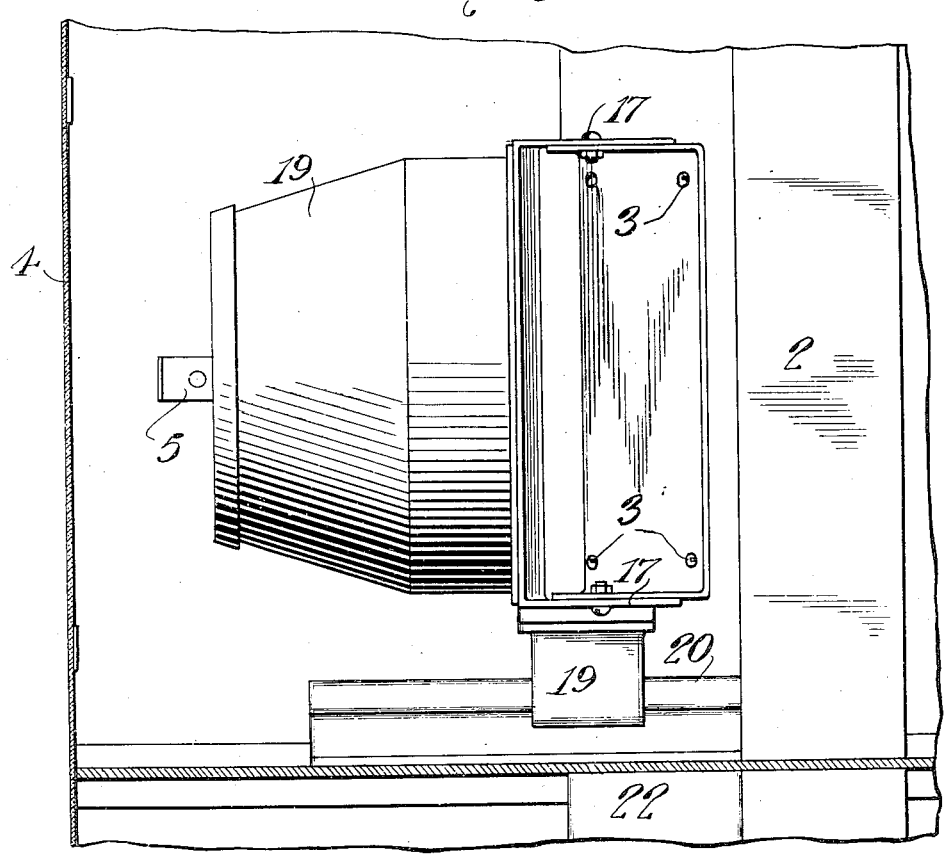
Figure 3 is a plan view of the light assembly with the upper covering of the wing removed.

Referring more particularly to the drawings, the landing light assembly is attached by means of suitable bolts 3 to the leading spar 2 of the wing 1. The leading edge of the wing fore of the spar 2 is preferably formed of substantially rigid material. At the extreme leading edge is formed an orifice which is covered by transparent section 4 of restricted area, being lesser in its vertical dimension than the leading edge of the wing, and curved to conform to the contour of the wing, and attached to the wing by means of rivets 5. The upper surface of the leading edge is provided with an inspection door 6 which is provided with suitable catches 7 normally maintained closed by the springs 8, but opened by application of hand pressure on the projection 9. A chain 10, riveted to the leading edge at 11 and to the inspection door at 12, serves as a means of lessening the likelihood of the door becoming lost. The transparent section 4 merely replaces a small portion of the leading edge and this does not in any way affect or alter the streamline or other aerodynamic characteristics of the wing.

In order to obtain the desired light projection the lamp is placed at a point considerably distantly removed from the transparent section 4. The lamp carrying assembly is illustrated in Figure 1 as comprising a bracket 15 bolted at 3 through the bolt holes 3' to the wing spar 2. Releasably and adjustably connected to this bracket is a substantially conically-shaped projector, the same being connected at its lower side by a screw bolt 16 and at its upper side by a similar bolt 17. The apertures 17ª, 17ᵇ and 17ᶜ may be selectively engaged by the bolt 17 upon a manual tilting adjustment of the cone about bolt 16 as a pivot. A lamp socket 24 is conveniently arranged to receive the lamp 13 lying within the principal focus of a parabolic or other type of reflector 14 held in position by a bracket 18. The cone 19 converges so that its forward portion practically coincides in size with that of the transparent section 4, thus providing an initial converging of the light beams before they reach the transparent opening.

Figure 4:
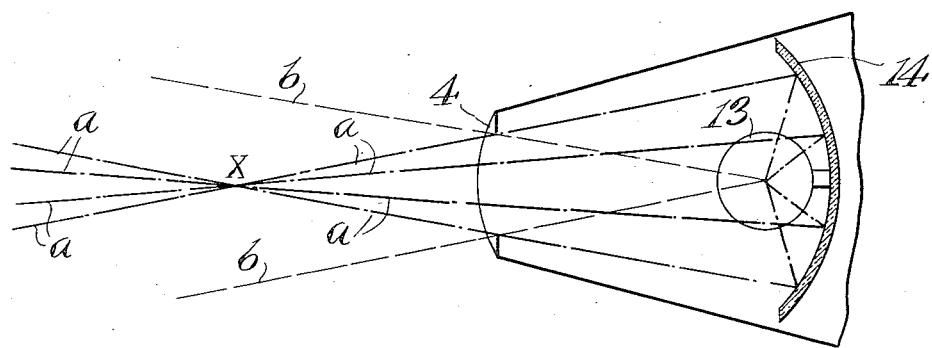
Figure 4 is a diagrammatical illustration of the lamp showing the manner of travel of the direct and reflected light beams.

The action of the light beams is best understood by a reference to Figure 4 in which are diagrammatically shown the lamp, the leading edge of the wing, and the transparent section 4. The direct light beams b—b are shown projected through the section 4 which has been described as being of a restricted size. The distance of the light source and the outlet from the wing being great, the resulting effect will be a comparatively long range light projection.

The beams of reflected light a—a are shown as coming to a focus at X, or comparatively close to the point of outlet from the wing. The succeeding diverging of the reflected light beams thus starts at such a point as to insure the maximum efficiency in light projection for airplane search lamp purposes. The relationship of the wing, the light orifice, the lamp, and the reflector is such that the light rays, both direct and reflected, are projected through the orifice in the direction of flight of the airplane.

By means of suitable adjustment of the lamp and reflector with relation to the orifice, the focus may be set at any desired distance from the wing of the plane within certain limits. In this manner a maximum of light is obtainable on the landing field when the aircraft is at any desired predetermined distance therefrom.

A suitable means for tilting the lamp having been disclosed, the lamp may be adjusted forwardly or rearwardly by providing a channel beam 19 bolted at 21 to the lamp carrying assembly, and by slidably mounting the channel beam 19 on an I-beam 20 secured to any suitable longitudinal interior wing bracing member 23.

The distance between the lamp and orifice is, to a large extent, a matter of choice. The lamp could, if desired, be mounted immediately behind the plate 18. This, however, would necessitate the use of a thicker wing, or a smaller, and less efficient reflector. The lamp, too, would be very close to the wing surface, and might possibly damage the same by radiated heat. For all these reasons, it is desirable to mount the lamp some considerable distance behind the leading edge of the plane.

Another advantage of mounting the lamp some distance behind the leading wing edge arises from the fact that, since the pencil of reflected light a—a is converging, it will be the smaller, the farther from the reflector; the aperture and glass plate may then be made correspondingly smaller. In an extreme case, of course, the focus of the beam could be made to practically coincide with the aperture, making possible an exceedingly small aperture.

It is to be understood that various changes in the construction of the embodiment illustrated in the drawings may be made without departing from the spirit of the invention and it is not desired to limit the invention to this illustration but to interpret the invention broadly in light of the appended claims.

What I claim is:

1. The combination with an aircraft wing, of a lamp, reflector, and a converging cone surrounding same and contained wholly within said wing, a light ray orifice of restricted area provided with a transparent covering attached to the leading edge of said wing and of such contour as to conform with the streamline formation of said wing, said lamp, reflector, and cone being so arranged as to focus the reflected light beams at a point substantially immediately in front of said leading edge, said lamp, reflector, and cone being adjustable as a unit with relation to their respective distances from said light orifice, both horizontally toward and from said orifice and pivotally about a transverse axis.

2. The combination with an aircraft wing, of a lamp, reflector, and a converging cone surrounding same and contained wholly within said wing, a light ray orifice of restricted area provided with a transparent covering attached to the leading edge of said wing and of such contour as to conform with the streamline formation of the wing, said lamp, reflector, and cone being arranged at a point considerably rearwardly of said light orifice, said lamp reflector, and cone being adjustable as a unit with relation to their respective distances from said light orifice, both horizontally toward and from said orifice and pivotally about a transverse axis.

3. The combination with an aircraft wing, of a lamp, a reflector, and a converging cone surrounding same and contained wholly within said wing, a light ray orifice of restricted area provided with a transparent covering attached to the leading edge of said wing and of such contour as to conform with the streamline formation of said wing, said lamp, reflector, and cone being so arranged as to focus the reflected light beams at a point substantially immediately in front of said leading edge, and means for horizontally sliding and pivotally tilting said lamp, reflector, and cone as a unit for adjusting their relation to said light orifice.

4. The combination with an aircraft wing, of a lamp, a reflector, and a converging cone surrounding same and contained wholly within said wing, a light ray orifice of restricted area provided with a transparent covering attached to the leading edge of said wing and of such contour as to conform with the streamline formation of said wing, said lamp, reflector, and cone being so arranged as to focus the reflected light beams at a point substantially immediately in front of said leading edge, and adjustable means for varying the distances of said lamp, reflector, and a cone as a unit from said light orifice, both horizontally toward and from said orifice and pivotally about a transverse axis.

5. In an airplane landing light, a source of light disposed within the wing, a transverse rigid detachable section of wing skin in front of said source of light, a reflector in fixed relation with said light, and means for adjusting the direction and quality of the beam emitted through said transparent wing section, said means comprising means for moving said source of light and said reflector as a unit pivotally about a transverse axis and also horizontally toward and away from said transparent wing section.

In testimony whereof, I have signed my name to this specification this 9th day of January, 1929.

SHERMAN MILLS FAIRCHILD.